United States Patent
Park et al.

(10) Patent No.: US 9,907,093 B2
(45) Date of Patent: Feb. 27, 2018

(54) METHOD AND APPARATUS FOR RANDOM ACCESS IN COMMUNICATIONS SYSTEM

(71) Applicant: Electronics and Telecommunications Research Institute, Daejeon (KR)

(72) Inventors: Juho Park, Daejeon (KR); Young Seog Song, Daejeon (KR); Jun Hwan Lee, Seoul (KR); Eun-Young Choi, Daejeon (KR); Young Jo Ko, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 122 days.

(21) Appl. No.: 14/982,305

(22) Filed: Dec. 29, 2015

(65) Prior Publication Data

US 2016/0192401 A1    Jun. 30, 2016

(30) Foreign Application Priority Data

Dec. 29, 2014 (KR) .......................... 10-2014-0192654
Dec. 24, 2015 (KR) .......................... 10-2015-0185733

(51) Int. Cl.
*H04W 72/04* (2009.01)
*H04W 74/08* (2009.01)

(52) U.S. Cl.
CPC ..... *H04W 74/0833* (2013.01); *H04W 72/046* (2013.01); *H04W 72/0453* (2013.01)

(58) Field of Classification Search
CPC ................................................ H04W 74/0833
See application file for complete search history.

(56) References Cited

U.S. PATENT DOCUMENTS

| | | | | |
|---|---|---|---|---|
| 8,165,097 B2 * | 4/2012 | Yi | .......................... | H04B 7/0617 370/252 |
| 8,406,775 B2 * | 3/2013 | Ahn | ..................... | H04B 7/0408 455/447 |
| 9,698,884 B2 * | 7/2017 | Guey | .................... | H04B 7/0617 |
| 9,814,068 B2 * | 11/2017 | Frenne | ................ | H04W 74/008 |
| 2005/0220057 A1 * | 10/2005 | Monsen | ............... | H04L 1/0041 370/334 |
| 2008/0001812 A1 * | 1/2008 | Jalali | .................... | H04B 7/0408 342/354 |

(Continued)

FOREIGN PATENT DOCUMENTS

EP          0981257 A2     2/2000
KR    1020000014101 A     3/2000

(Continued)

*Primary Examiner* — Parth Patel
(74) *Attorney, Agent, or Firm* — William Park & Associates Ltd.

(57) ABSTRACT

In a communications system using a plurality of beams, a terminal determines a beam to be communicated with the terminal among the plurality of beams, determines one sequence among sequences allocated to the determined beam as a beam based random access preamble, and transmits the beam based random access preamble through the determined beam. In addition, if a random access response for the beam based random access preamble is not received from a base station for a set interval, the terminal determines one sequence among sequences in a cell based random access preamble collection as a cell based random access preamble and transmits the cell based random access preamble.

12 Claims, 10 Drawing Sheets

(56) References Cited

U.S. PATENT DOCUMENTS

| | | | |
|---|---|---|---|
| 2010/0103900 A1* | 4/2010 | Yeh | H04B 7/0695 370/330 |
| 2010/0128656 A1* | 5/2010 | Kim | H04B 7/2041 370/316 |
| 2012/0320874 A1* | 12/2012 | Li | H04W 48/12 370/331 |
| 2013/0029657 A1* | 1/2013 | Gao | H04W 74/004 455/422.1 |
| 2014/0010178 A1* | 1/2014 | Yu | H04W 74/0833 370/329 |
| 2014/0079011 A1* | 3/2014 | Wiberg | H04W 74/006 370/329 |
| 2014/0112220 A1* | 4/2014 | Kwak | H04B 7/0695 370/294 |
| 2014/0177607 A1* | 6/2014 | Li | H04W 74/0833 370/336 |
| 2014/0192768 A1* | 7/2014 | Yeh | H04B 7/0469 370/330 |
| 2014/0254515 A1* | 9/2014 | Kim | H04W 74/0833 370/329 |
| 2014/0376466 A1* | 12/2014 | Jeong | H04W 74/0833 370/329 |
| 2015/0063203 A1* | 3/2015 | Kim | H04B 7/0408 370/326 |
| 2015/0173004 A1* | 6/2015 | Nigam | H04W 48/16 370/331 |
| 2015/0229375 A1* | 8/2015 | Vook | H04B 7/0469 370/329 |
| 2015/0236932 A1* | 8/2015 | Yu | H04W 24/08 370/252 |
| 2015/0305066 A1* | 10/2015 | Jeong | H04W 74/0833 370/225 |
| 2015/0334746 A1* | 11/2015 | Sun | H04B 17/309 370/329 |
| 2015/0358914 A1* | 12/2015 | Song | H04W 52/221 370/280 |
| 2015/0382205 A1* | 12/2015 | Lee | H04B 7/0417 370/329 |
| 2016/0029358 A1* | 1/2016 | Hou | H04B 7/0695 370/329 |
| 2016/0043781 A1* | 2/2016 | Cho | H04L 5/0051 342/373 |
| 2016/0087765 A1* | 3/2016 | Guey | H04L 27/2613 370/330 |
| 2016/0099763 A1* | 4/2016 | Chen | H04B 7/0617 370/329 |
| 2016/0143009 A1* | 5/2016 | Zhang | H04L 27/26 370/329 |
| 2016/0157267 A1* | 6/2016 | Frenne | H04B 7/086 370/329 |
| 2016/0165640 A1* | 6/2016 | Yang | H04W 4/005 370/336 |
| 2016/0183195 A1* | 6/2016 | Gao et al. | H04W 52/146 455/522 |
| 2016/0192400 A1* | 6/2016 | Sohn | H04W 74/0833 370/252 |
| 2016/0198497 A1* | 7/2016 | Yu | H04W 74/08 370/330 |
| 2016/0212631 A1* | 7/2016 | Shen | H04W 16/28 |
| 2016/0255591 A1* | 9/2016 | Park | H04W 52/242 455/522 |
| 2016/0277225 A1* | 9/2016 | Frenne | H04W 56/0015 |
| 2016/0308637 A1* | 10/2016 | Frenne | H04J 11/0069 |
| 2016/0337056 A1* | 11/2016 | Frenne | H04B 7/0695 |
| 2016/0374006 A1* | 12/2016 | Chen | H04W 24/08 |
| 2017/0013643 A1* | 1/2017 | Nan | H04W 74/006 |
| 2017/0094681 A1* | 3/2017 | Takeda | H04W 16/14 |
| 2017/0244460 A1* | 8/2017 | Li | H04B 7/0619 |
| 2017/0257780 A1* | 9/2017 | Ryoo | H04W 16/28 |
| 2017/0280481 A1* | 9/2017 | Stern-Berkowitz | H04W 74/008 |

FOREIGN PATENT DOCUMENTS

| | | |
|---|---|---|
| KR | 1020140004513 A | 1/2014 |
| KR | 1020140109633 A | 9/2014 |

* cited by examiner

| CONTENTION BASED PREAMBLE COLLECTION | | | | NON-CONTENTION BASED PREAMBLE COLLECTION | |
|---|---|---|---|---|---|
| BEAM BASED PREAMBLE GROUP (BG0) | BEAM BASED PREAMBLE GROUP (BG1) | CELL BASED PREAMBLE GROUP (CG0) | CELL BASED PREAMBLE GROUP (CG1) | CELL BASED PREAMBLE GROUP (CG2) | BEAM BASED PREAMBLE GROUP (BG2) |

METHOD AND APPARATUS FOR RANDOM ACCESS IN COMMUNICATIONS SYSTEM

CROSS-REFERENCE TO RELATED APPLICATION

This application claims priority to and the benefit of Korean Patent Application Nos. 10-2014-0192654 and 10-2015-0185733 filed in the Korean Intellectual Property Office on Dec. 29, 2014 and Dec. 24, 2015, the entire contents of which are incorporated herein by reference.

BACKGROUND OF THE INVENTION (a) Field of the Invention

The present invention relates to a method and apparatus for a random access in a communications system, and more particularly, to a method and apparatus for a random access in a communications system operating a multi-beam.

(b) Description of the Related Art

In a mobile communications system, a random access procedure is performed so that uplink synchronization and uplink resource are allocated to a terminal in order for the terminal to perform an initial access and a connection setting with a base station. Besides, the random access procedure is also used for a scheduling request, a recovery of radio link failure, and the like. In LTE/LTE-A, the random access procedure is initiated by sending a specific preamble to a resource allocated for a given random access by the terminal.

In LTE/LTE-A, a Zadoff-Chu (ZC) sequence having a length of 839 or 139 is used as a preamble for the random access, and 64 different ZC sequences are allocated to one cell for random access. The 64 ZC sequences allocated to one cell are classified into a contention based random access sequence group and a non-contention based random access sequence group, and the contention based random access sequence group is classified into two groups, which are a group A and a group B. Depending on an amount of MAC data to be transmitted to the base station by the terminal in the random access procedure and a state of a channel, the sequence in the group A or the group B is selectively used. In a general random access, the terminal selects one among the sequences in the contention based random access sequence group and uses the selected sequence for the random access.

Meanwhile, depending on characteristics of the ZC sequence, a specific ZC sequence and a sequence obtained by cyclic shifting the specific ZC sequence are perpendicular to each other. Thus, in LTE/LTE-A, the 64 ZC sequences to be used for the random access for each cell may be configured of a root ZC sequence and the ZC sequence generated by cyclic shifting the root ZC sequence. Thereby, interference between the preambles may be minimized in the random access procedure within the cell, and inter-cell interference may also be decreased. A time in which the terminal may transmit the preambles in a specific cell, and a location of a frequency resource are informed to the terminal through system information by the base station, and the terminal arbitrarily selects one among the preambles usable in an allocated resource and transmits the selected preamble.

A general procedure of the random access will be described in more detail. The base station informs the system information including preamble information, maximum transmission power information, and the like for the random access to all of terminals in the cell. The terminal receiving the system information selects an arbitrary preamble suitable for a situation of the terminal among the preambles usable for the random access and transmits the selected preamble to the base station using the allocated time and frequency resource. The base station attempts to detect the preamble from the time and frequency resource allocated to the random access, and if the preamble is received, the base station transmits a random access response for the received preamble to the terminal. In this case, when several terminals in the cell use the same preamble in the same time and the same frequency resource, the base station does not distinguish a plurality of terminals and a contention resolution procedure should be performed later. The random access response includes timing advance (TA) information for matching the uplink synchronization, index information of the detected preamble, and uplink resource allocation information to be used for a future random access procedure. The random access response is transmitted via PDSCH, and PDCCH for a corresponding PDSCH is scrambled with RA-RNTI. Here, RA-RNTI is generated as expressed in Equation 1.

$$\text{RA-RNTI} = 1 + t\_id + 10 * f\_id \qquad \text{[Equation 1]}$$

Here, t_id, which is an integer between 0 and 10, denotes an index for a first subframe of a specific physical random access channel (PRACH), and f_id, which is an integer between 0 and 6, denotes a frequency index for the specific PRACH.

The terminal receiving PDCCH scrambled with RA-RNTI corresponding to the resource transmitted by the terminal performs a network entrance procedure such as transferring an RRC connection request message using the uplink resource allocation information allocated to the random access response and is switched to a state in which data may be transmitted and received.

Meanwhile, since an attenuation of a channel seriously occurs in a mobile communications system based on a millimeter wave of 30 GHz or more, the mobile communications system should use a directional beam in order to compensate for the attenuation. Since a channel of a millimeter wave band has strong linearity of a radio wave, one directional beam may cover only a specific area within the cell. Thus, in order to completely cover the cell by one base station, a plurality of directional beams should be simultaneously operated. A receiving terminal of each directional beam may include an RF module and a base band modem. In this case, the signal received by each beam may be independently demodulated for each beam. Alternatively, one RF module and one base band modem may be provided to several beams. In this case, data may be independently demodulated for the reception signal of each beam and the reception signals of the several beams may also be collected to demodulate data at the same time.

As such, in a communications system in which the base station uses the plurality of beams, the base station may receive the signal transmitted from one terminal through the several beams depending on channel characteristics between the base station and the terminal. Thus, in the case in which the random access procedure such as an existing LTE/LTE-A is used in the communications system using the plurality of beams, the preambles transmitted from the terminal may be detected from the plurality of beams of the base station, and in the case in which a preamble detection is each attempted for each beam, a lot of time and computation may be spent for the preamble detection.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for a random access in a communications system capable of reducing a random access preamble detection time in the communications system operating a multi-beam.

An exemplary embodiment of the present invention provides a method for a random access of a terminal in a communications system using a plurality of beams. The method may include determining a beam to be communicated with the terminal among the plurality of beams; determining a random access preamble from one group of a beam based preamble group and a cell based preamble group; transmitting the random access preamble through the determined beam; and if a random access response for the random access preamble is not received from a base station for a set interval, determining the random access preamble from another group and transmitting the determined random access preamble through the determined beam.

The determining of the random access preamble from one group may include if it does not correspond to a set exception condition, preferentially selecting the random access preamble from the beam based preamble group; and if it corresponds to the exception condition, selecting the random access preamble from the cell based preamble group.

The exception condition may be set by at least one of a path-loss value, inter-beam interference, and restriction on latency of the terminal.

The set interval may include an interval retransmitting the beam based random access preamble as many as the set number of times.

A plurality of sequences usable for a random access may be classified into the cell based preamble group and the beam based preamble group, and sequences in the beam based preamble group may be allocated to the plurality of beams.

The method may further include if a random access response for the random access preamble is not received from the base station within the set interval, increasing transmission power of the random access preamble as many as the set number of times to retransmit the random access preamble.

The determining of the beam to be communicated with the terminal may include measuring signal quality of each beam based on downlink reference signals each transmitted through the plurality of beams from the base station; and determining a beam having the best signal quality as a beam to be communicated with the terminal.

Another embodiment of the present invention provides a method for a random access of a base station in a communications system using a plurality of beams. The method may include performing a detection operation of a random access preamble transmitted from a terminal from a resource allocated to a random access for each beam; if a beam based random access preamble is detected from any one of the plurality of beams, transmitting a random access response to the terminal using the beam from which the beam based random access preamble is detected; and if a cell based random access preamble is detected from at least one of the plurality of beams, transmitting the random access response to the terminal using a beam to which the terminal belongs.

The method may further include classifying a plurality of sequences usable for a random access into a cell based preamble group and a beam based preamble group; allocating sequences in the beam based preamble group to the plurality of beams; and transmitting sequence classification information for each group and sequence allocation information for each beam to the terminal, wherein the beam based random access preamble may be a sequence selected among the sequences allocated to any one beam, and the cell based random access preamble may be a sequence selected among sequences in the cell based preamble group.

The performing of the detection operation of the random access preamble may include detecting the beam based random access preamble using sequences allocated to a corresponding beam for each beam; and detecting the cell based random access preamble using sequences in the cell based preamble group for each beam.

The transmitting of the random access response to the terminal using the beam to which the terminal belongs may include confirming the beam to which the terminal belongs.

The confirming of the beam to which the terminal belongs may include measuring reception quality of the cell based random access preamble from the at least one beam; and determining a beam having the highest reception quality of the cell based random access preamble as the beam to which the terminal belongs.

The confirming of the beam to which the terminal belongs may include receiving information of the beam to which the terminal belongs, from the terminal.

Yet another embodiment of the present invention provides an apparatus for a random access of a terminal in a communications system using a plurality of beams. The apparatus for a random access may include a processor and a transceiver. The processor may determine a beam to be communicated with the terminal among the plurality of beams, determine a beam based random access preamble among sequences allocated to the determined beam, and determine a cell based random access preamble among sequences in a cell based preamble collection; and The transceiver may transmit the cell based random access preamble by a set condition after transmitting the beam based random access preamble.

If a random access response for the beam based random access preamble is not received from a base station for a set interval, the processor may transmit the cell based random access preamble through the transceiver.

A plurality of sequences usable for a random access may be classified into a cell based preamble group and a beam based preamble group by the base station, and sequences in the beam based preamble group may be allocated to the plurality of beams, and the transceiver may receive sequence classification information for each group and sequence allocation information for each beam from the base station.

Yet another embodiment of the present invention provides an apparatus for a random access of a base station in a communications system using a plurality of beams. The apparatus for a random access may include a processor and a transceiver. The processor may perform a detection operation of a beam based random access preamble using sequences allocated to a corresponding beam from a resource allocated to a random access for each beam, perform a detection operation of a cell based random access preamble using sequences in a cell based preamble group for each beam, and generate a random access response when a random access preamble is detected by the detection operation of the beam based random access preamble or the detection operation of the cell based random access preamble. The transceiver may transmit the random access response to a terminal.

The processor may classify a plurality of sequences usable for a random access into a cell based preamble group and a beam based preamble group, and allocate sequences in the beam based preamble group to the plurality of beams, and the beam based random access preamble may be a sequence selected among the sequences allocated to any one beam by the terminal, and the cell based random access preamble may be a sequence selected among sequences in the cell based preamble group by the terminal.

If the beam based random access preamble is detected by the detection operation of the beam based random access preamble, the transceiver may transmit the random access response through a beam from which the beam based random access preamble is detected.

If the cell based random access preamble is detected by the detection operation of the cell based random access preamble, the processor may confirm a beam to which the terminal belongs, and the transceiver may transmit the random access response through the beam to which the terminal belongs.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising", will be understood to imply the inclusion of stated elements but not the exclusion of any other elements.

Throughout the specification, a terminal may represent a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like, and may include all or some of the functions of the MT, the MS, the AMS, the HR-MS, the SS, the PSS, the AT, the UE, or the like.

In addition, a base station (BS) may represent an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as the base station, a relay node (RN) serving as the base station, an advanced relay station (ARS) serving as the base station, a high reliability relay station (HR-RS) serving as the base station, a small base station [femto BS, a home node B (HNB), a home eNodeB (HeNB), a pico BS, a metro BS, a micro BS, or the like], or the like, and may include all or some of the functions of the ABS, the nodeB, the eNodeB, the AP, the RAS, the BTS, the MMR-BS, the RS, the RN, the ARS, the HR-RS, the small base station, or the like.

Hereinafter, a method and apparatus for a random access in a communications system according to exemplary embodiments of the present invention will be described in detail with reference to the accompanying drawings.

Figure 1:
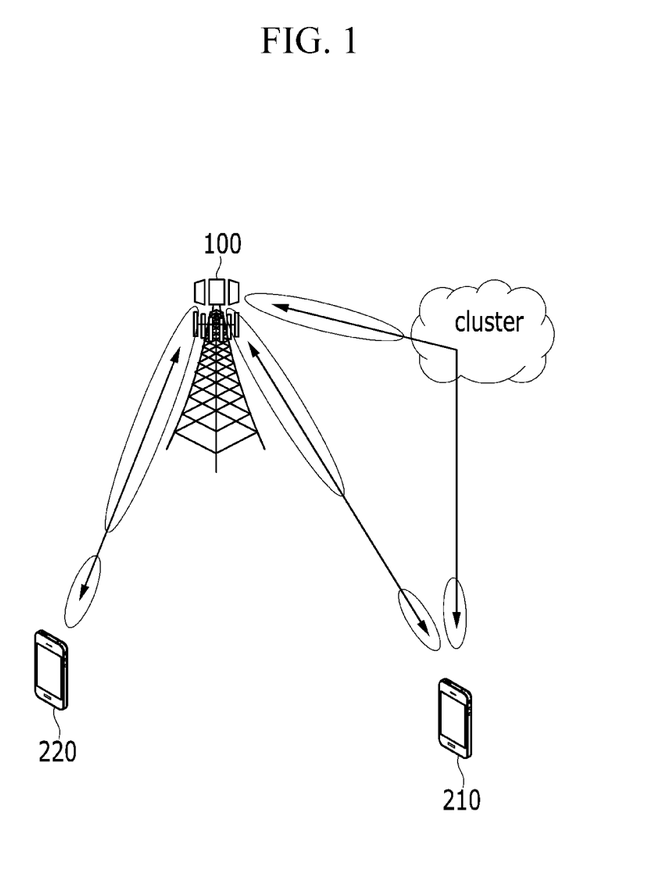
FIG. 1 is a drawing illustrating an example of a communications system operating a multi-beam according to an exemplary embodiment of the present invention.

FIG. 1 is a drawing illustrating an example of a communications system operating a multi-beam according to an exemplary embodiment of the present invention.

Referring to FIG. 1, a communications system includes a base station 100 and a plurality of terminals 210 and 220. In FIG. 1, only two terminals 210 and 220 are illustrated for convenience for explanation.

The base station 100 and the terminals 210 and 220 may communicate with each other using a millimeter wave band of 30 GHz to 300 GHz.

Since the millimeter wave band easily allocates a wide and continuous radio resource as compared to a band of 30 GHz or less which is used in an existing mobile communications network, it may increase capacity of a communications system. However, since the millimeter wave band has strong linearity and radio wave loss, the base station 100 and the terminals 210 and 220 use a beamforming technology in order to solve the strong linearity and radio wave loss of the millimeter wave band.

The base station 100 generates a multi-beam using the beamforming technology and simultaneously transmits a signal to the terminals 210 and 220 through the multi-beam to communicate with the plurality of terminals 210 and 220 in the millimeter wave band. The beamforming technology may be classified into fixed and adaptive beamforming technologies. Fixed beams generated by the fixed beamforming technology each have a determined beam direction and a beam size. In the case in which the base station 100 operates the fixed beams, the multi-beam may be generated so as to cover the entire cell. In this case, an overlapped beam may be generated to prevent a coverage hole. Meanwhile, adaptive beams generated by the adaptive beamforming technology have beam directions and beam sizes which are adaptively changed in an uplink and a down link depending on a change of a channel and a location of the base station 100 or the terminals 210 and 220.

The terminals 210 and 220 perform a random access procedure for setting a connection with the base station 100.

The terminals 210 and 220 may determine a beam having the best signal among the multi-beam during a random access procedure and perform a random access using the determined beam.

If the random access procedure is successfully completed, the terminals 210 and 220 may perform a data transmission procedure with the base station 100.

In a communications system performing communication using the beamforming technology, the base station 100 and the terminals 210 and 220 may transmit and receive the signal through one or more transmission beams or one or more reception beams. For example, signals transmitted from several transmission beams of the base station 100 or signals transmitted from transmission beams of several base stations may be received at the reception beam of the terminal 210 by an overlap of radiation pattern between the beam and the beam or a multi-path by a cluster on a building or a path. Similarly, the base station 100 may also receive a signal transmitted from the transmission beam of one terminal 210 through several reception beams.

Figure 2:
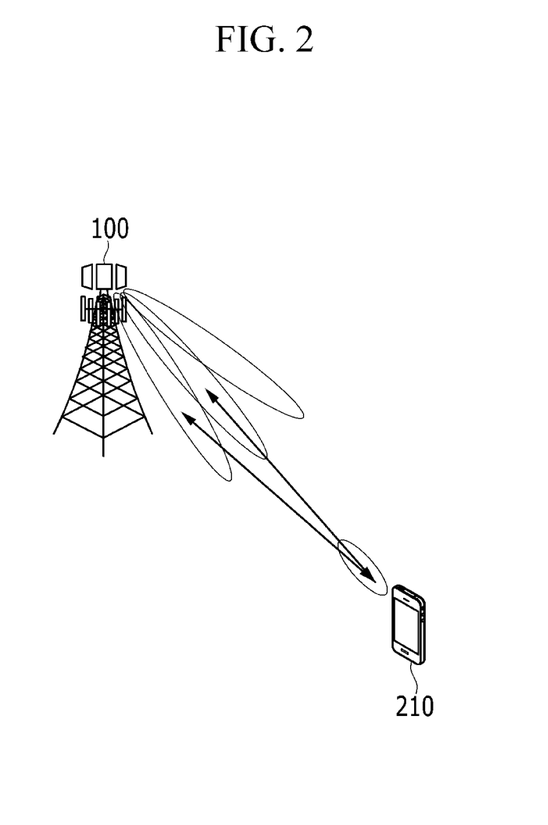
FIG. 2 is a drawing illustrating an example of signal transmission and reception of a base station and a terminal in the communications system operating the multi-beam according to an exemplary embodiment of the present invention.

FIG. 2 is a drawing illustrating an example of signal transmission and reception of a base station and a terminal in the communications system operating the multi-beam according to an exemplary embodiment of the present invention.

As illustrated in FIG. 2, the base station 100 and the terminal 210 transmit and receive the signal by selecting the number of beams capable of securing an optimal channel environment among various transmission beams or reception beams. For example, the terminal 210 may receive the signal transmitted through two transmission beams from the base station 100 through one reception beam, and the base station 100 may receive the signal transmitted through one transmission beam from the terminal 210 through two reception beams.

The terminals 210 and 220 perform a random access procedure for setting a connection with the base station 100. If the random access procedure is successfully completed, the terminals 210 and 220 may perform a data transmission procedure with the base station 100.

Here, in an existing LTE, the terminal only needs to determine the base station to be communicated. However, in the communications system using the multi-beam, the terminal needs to determine what beam is to be used in the base station as well as the base station and share beam information with the base station. In addition, if the random access procedure is performed, the terminal and the base station need to become a state capable of transmitting and receiving data. Thus, a transmission and reception beam selection procedure of the base station needs to be performed during the random access procedure.

As such, as the multi-beam is used in the communications system, a change is also demanded for the random access procedure.

Figure 3:
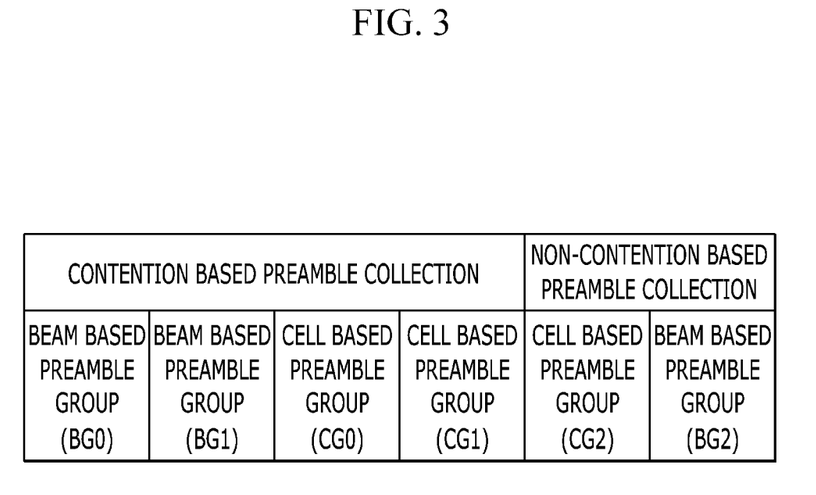
FIG. 3 is a drawing illustrating an example of a method for classifying a random access preamble according to an exemplary embodiment of the present invention.
Figure 4:
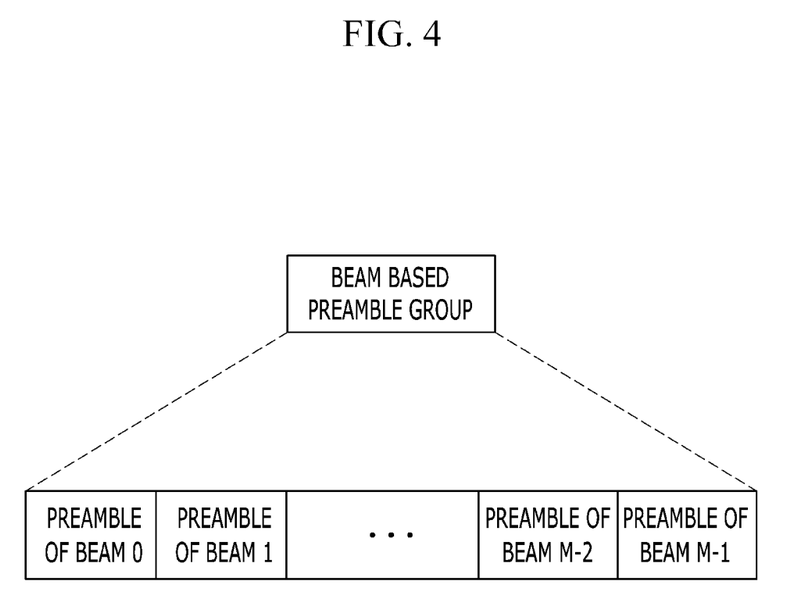
FIG. 4 is a drawing illustrating an example of a beam based random access preamble collection illustrated in FIG. 3.

FIG. 3 is a drawing illustrating an example of a method for classifying a random access preamble according to an exemplary embodiment of the present invention and FIG. 4 is a drawing illustrating an example of a beam based random access preamble collection illustrated in FIG. 3.

Referring to FIG. 3, the base station 100 classifies a plurality of sequences used as random access preambles into a contention based preamble collection and a non-contention based preamble collection, respectively. In addition, the base station 100 subdivides sequences in the contention based preamble collection into one or more cell based preamble groups CG0 and CG1, and one or more beam based preamble groups BG0 and BG1, and subdivides sequences in the non-contention based preamble collection into one or more cell based preamble group CG2 and one or more beam based preamble group BG2.

In addition, referring to FIG. 4, the sequences in the beam based preamble groups BG0, BG1, BG2 are classified into random access preambles usable in the respective beams. For example, in the case in which the base station 100 operates M beams, the sequences in the beam based preamble groups BG0, BG1, and BG2 may be classified into preambles of beam 0, preambles of beam 1, . . . , preambles of beam M−2, and preambles of beam M−1.

The base station 100 may inform random access preamble classification information and transmission power of the preamble illustrated in FIGS. 3 and 4 to the terminal through system information.

As the base station 100 uses a plurality of beams, inter-beam interference occurs. In general, interference between neighboring beams is greater than interference between non-neighboring beams. Thus, in order to minimize inter-preamble interference when the preambles are allocated to the respective beams, a ZC sequence generated by cyclic shifting the same root ZC sequence may be allocated between the neighboring beams, and the same root ZC sequence may be used for or another root ZC sequence may be allocated to the non-neighboring beams.

A PRACH resource through which the terminal transmits the preambles may also be differently allocated depending on the beam based preamble and the cell based preamble. In addition, the PRACH resource may also be differently allocated for each beam. Thereby, contention possibility may be significantly reduced, which helps to build up a low latency mobile communications system. In addition, RA-RNTI used for detection by the terminal during a random access response procedure may be generated as Equation 2.

$$RA\text{-}RNTI = 1 + t\_id + 10 * f\_id + 100 * beam\_id \qquad \text{[Equation 2]}$$

Here, beam_id denotes an index of a corresponding beam when the terminal uses the beam based preamble. When the terminal transmits the cell based preamble, beam_id is set to be 0 (beam_id=0).

As such, if RA-RNTI is generated, contention possibility may be reduced during the random response procedure.

Figure 5:
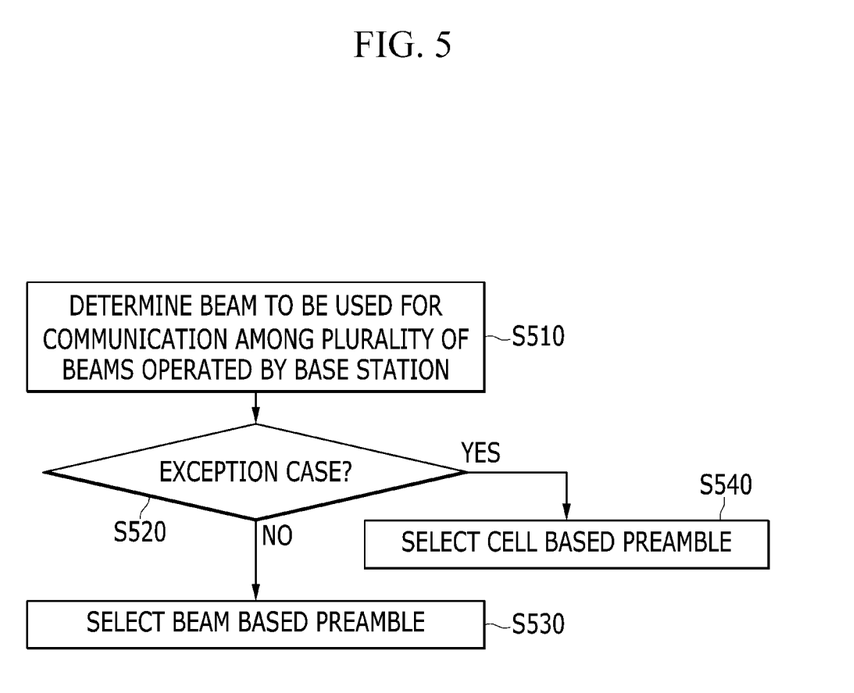
FIG. 5 is a flowchart illustrating a method for selecting a random access preamble in a terminal according to an exemplary embodiment of the present invention.

FIG. 5 is a flowchart illustrating a method for selecting a random access preamble in a terminal according to an exemplary embodiment of the present invention.

Referring to FIG. 5, if the terminal 210 is powered on, the terminal 210 determines a beam to be used for communication among a plurality of beams operated by the base station 100 (S510). For example, the beam to be used for communication among the plurality of beams operated by the base station 100 may be determined as follows. The base station 100 periodically transmits a downlink reference signal through the plurality of beams. If the terminal 210 is powered on, the terminal 210 measures signal quality of each beam based on the downlink reference signal of each beam transmitted from the base station 100, and determines a beam having the best signal quality as a beam to be used for communication. Meanwhile, if the terminal 210 also uses a directional beam, a reception beam of the terminal 210 is also determined.

If the beam to be used for communication is determined, the terminal 210 performs a random access procedure using the determined beam. In the random access procedure according to an exemplary embodiment of the present invention, a beam based random access preamble and a cell based random access preamble are used. The beam based random access preamble means a sequence selected for a random access among sequences in the beam based preamble groups BG0, BG1, and BG2. The cell based random access preamble means a sequence selected for a random access among sequences in the cell based preamble groups CG0, CG1, and CG2.

The terminal 210 selects the preambles from one group of the beam based preamble group and the cell based preamble group and performs the random access procedure. The terminal 210 preferentially selects the random access preamble from the beam based preamble group (S530), and in the exception case, the terminal 210 may select the random access preamble from the cell based preamble group (S520, S540). The following exception cases illustrate examples, and whether any preamble is used between beam based preamble and the cell based preamble may be determined depending on various other settings.

Exception case 1, if a value of path-loss estimated from a reference signal of the base station 100 is greater than a set reference value, the terminal 210 may select the preamble for the random access from the cell based preamble collection. Since the cell based preamble performs demodulation in all of beams in the base station, a reception SNR is high, thereby making it possible to increase demodulation possibility.

Exception case 2, if interference between a beam determined by the terminal 210 and a neighboring beam of the base station 100 is greater than a set reference value, the terminal 210 may select the preamble for the random access from the cell based preamble collection. In the case in which inter-beam interference is large, possibility in which the base station 100 fails to receive the beam based preamble by interference is high. Thus, the terminal 210 selects the preamble for the random access from the cell based preamble collection.

Exception case 3, in the case in which restriction on latency of the terminal 210 is higher than a set reference, the terminal 210 may select the preamble for the random access from the cell based preamble collection, and the terminal 210 may select the preamble for the random access from the cell based preamble collection according to other references.

Meanwhile, even if the terminal 210 performs the random access procedure using the beam based preamble group, if the terminal 210 does not success the random access within random access attempts of the predetermined number of times, the terminal 210 may select the preamble from the cell based preamble collection.

Figure 6:
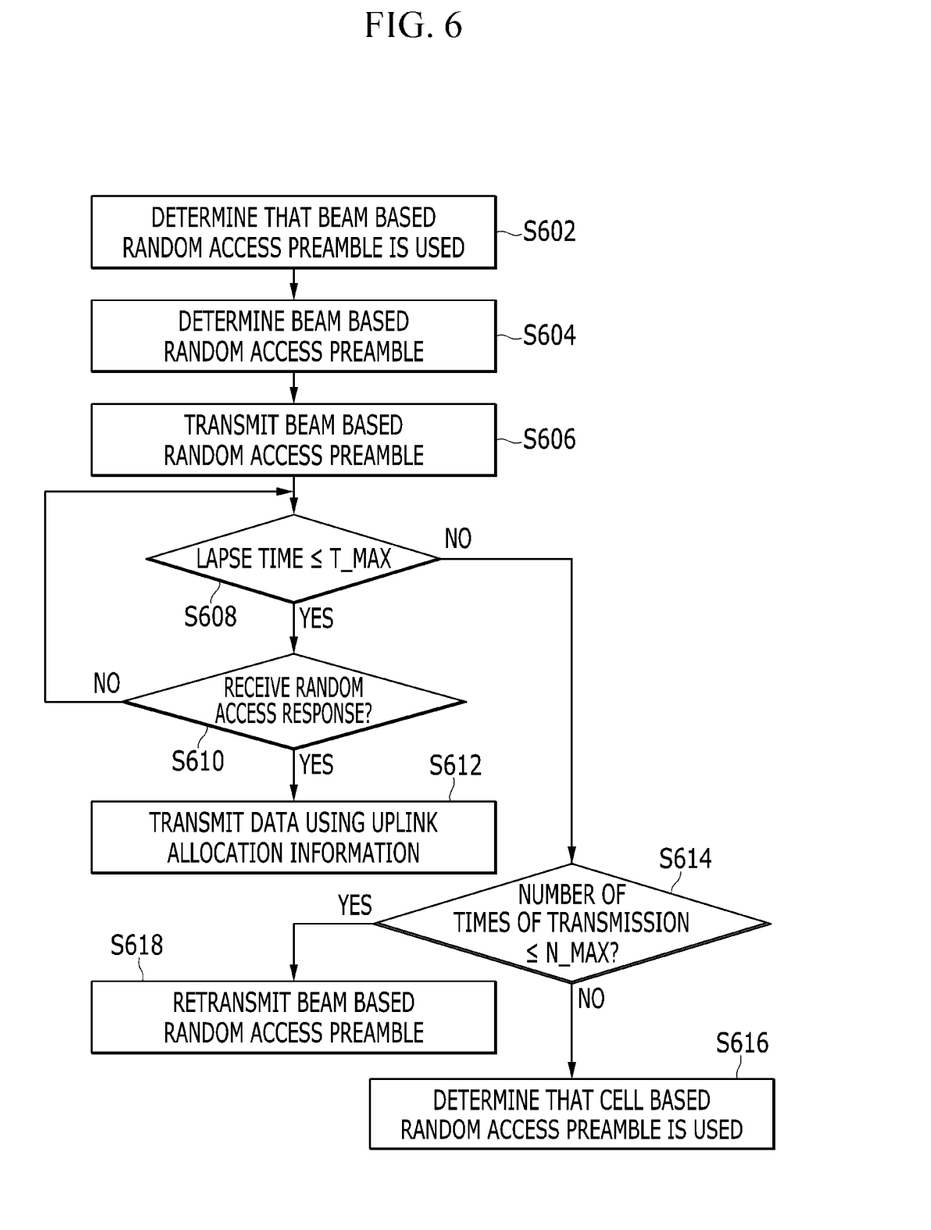
FIG. 6 is a flowchart illustrating a random access method using a beam based preamble of a terminal according to an exemplary embodiment of the present invention.

FIG. 6 is a flowchart illustrating a random access method using a beam based preamble of a terminal according to an exemplary embodiment of the present invention.

Referring to FIG. 6, if the terminal 210 determines that it uses the beam based preamble (S602), the terminal 210 is operated as follows.

The terminal 210 selects one group of the beam based preamble groups BG0, BG1, and BG2, and determines any sequence among sequences corresponding to the beam to be used for communication in the selected group as the beam based random access preamble (S604).

The terminal 210 transmits the determined beam based random access preamble to the base station 100 (S606). The terminal 210 may transmit the beam based random access preamble using a resource allocated for the random access, for example, PRACH. Here, the PRACH resource allocated for the random access may be different for each beam or all of beams may use the same PRACH resource.

After the terminal 210 transmits the beam based random access preamble, the terminal 210 attempts to receive a random access response from the base station 100. After the terminal 210 transmits the beam based random access preamble, the terminal 210 may attempt to receive the random access response from the base station 100 for a certain time t_max.

If the terminal 210 receives the random access response from the base station 100 within the certain time t_max after the terminal 210 transmits the beam based random access preamble (S608, S610), the terminal 210 transmits uplink data to the base station 100 using uplink resource allocation information included in the random access response (S612).

Meanwhile, if the terminal 210 does not receive the random access response while the certain time t_max lapses after the terminal 210 transmits the beam based random access preamble (S608) and the number of times of transmission of the beam based random access preamble is a preset number of times N_max or less (S614), the terminal 210 increases transmission power of the beam based random access preamble to retransmit the beam based random access preamble (S616).

In addition, if the terminal 210 does not receive the random access response while the certain time t_max lapses after the terminal 210 transmits the beam based random access preamble (S608) and the number of times of transmission of the beam based random access preamble is greater than the preset number of times N_max, the terminal 210 may determine that it uses the beam based preamble (S618).

Figure 7:
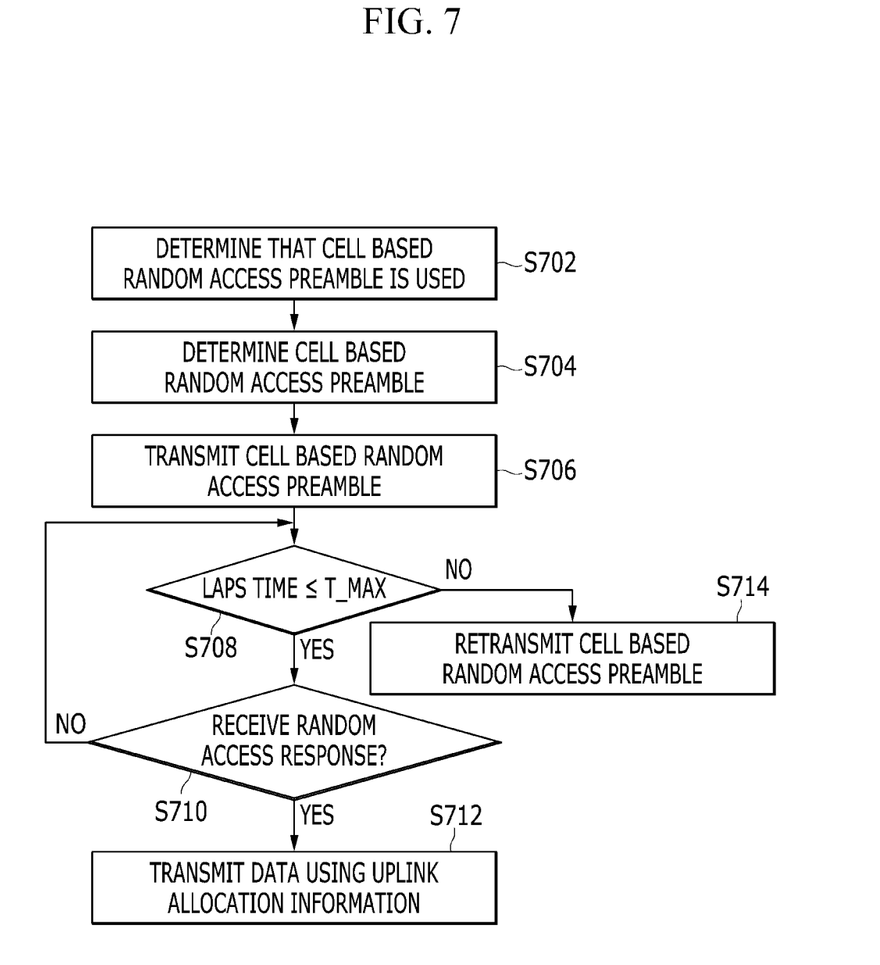
FIG. 7 is a flowchart illustrating a random access method using a cell based preamble of a terminal according to an exemplary embodiment of the present invention.

FIG. 7 is a flowchart illustrating a random access method using a cell based preamble of a terminal according to an exemplary embodiment of the present invention.

Referring to FIG. 7, if the terminal 210 determines that it uses the cell based random access preamble (S702), the terminal 210 selects one group within the cell based preamble groups CG0 and CG1, and determines any sequence among sequences belonging to the selected group as the cell based random access preamble (S704).

The terminal 210 transmits the determined cell based random access preamble to the base station 100 (S706). Here, the terminal 210 may transmit the cell based random access preamble using a resource allocated to transmit the cell based random access preamble.

After the terminal 210 transmits the cell based random access preamble, the terminal 210 may attempt to receive the random access response from the base station 100 for a certain time t_max.

If the terminal 210 receives the random access response from the base station 100 within the certain time t_max after the terminal 210 transmits the cell based random access preamble (S708, S710), the terminal 210 transmits uplink data to the base station 100 using uplink resource allocation information included in the random access response (S712).

Meanwhile, if the terminal 210 does not receive the random access response while the certain time t_max lapses after the terminal 210 transmits the cell based random access preamble, the terminal 210 increases transmission power of the cell based random access preamble to retransmit the cell based random access preamble (S714).

Figure 8:
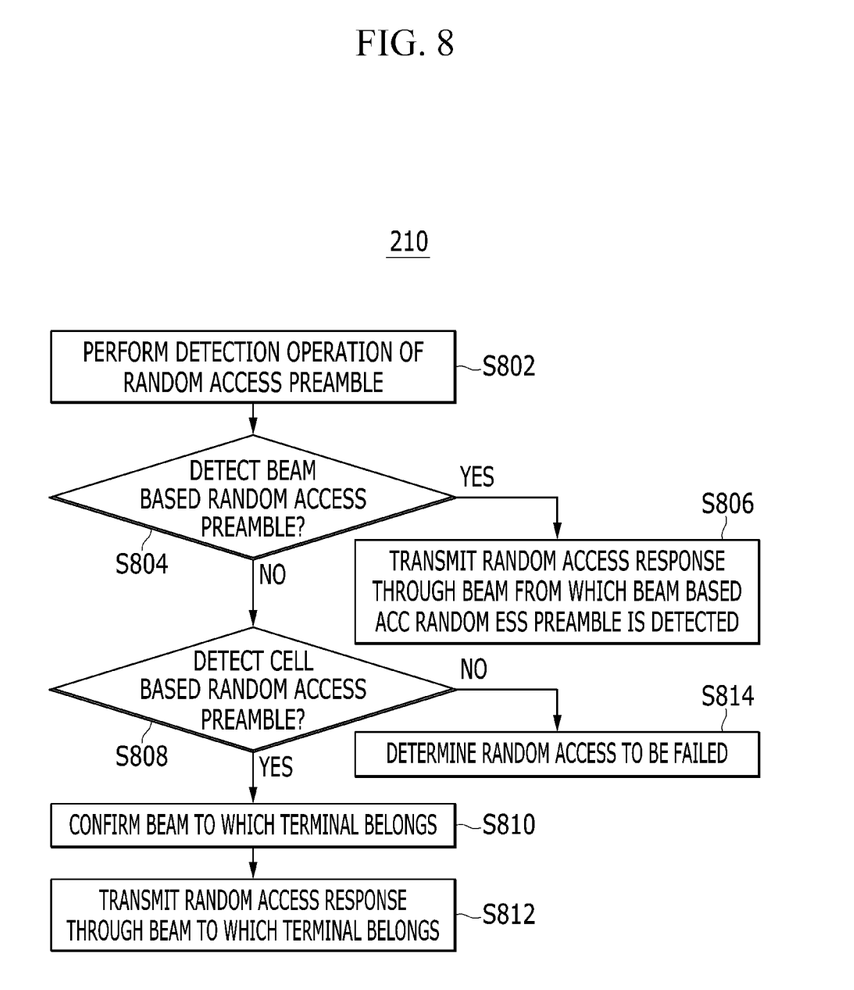
FIG. 8 is a flowchart illustrating a random access method of a base station according to an exemplary embodiment of the present invention.

FIG. 8 is a flowchart illustrating a random access method of a base station according to an exemplary embodiment of the present invention.

Referring to FIG. 8, the base station 100 performs a detection operation of the random access preamble transmitted from the terminal, from a resource allocated to the random access for each beam (S802). Since the beam based random access preamble and the cell based random access preamble are used in the random access procedure, both a detection of the beam based random access preamble and a detection of the cell based random access preamble are performed for each beam of the base station 100. Particularly, a detection of the random access preamble allocated to a corresponding beam in the resource allocated to transmit the beam based random access preamble is attempted for each beam of the base station 100. In addition, a detection of the cell based random access preamble in the resource allocated to transmit the cell based random access preamble is attempted for each beam of the base station 100. A procedure of detecting the cell based random access preamble may be the same operation as that performed by the base station to detect the random access preamble in the existing LTE/LTE-A.

As such, in the random access procedure according to an exemplary embodiment of the present invention, possibility of preamble contention may be reduced by using the beam based random access preamble, and since the detection of the preamble allocated to the corresponding beam and the cell based preamble only needs to be attempted in the respective beams, detection computation of the random access preamble required for each beam may be reduced. At the same time, since the detection of the cell based random access preamble is attempted for all of beams in the base station, a success ratio of the detection of the random access preamble may be maintained.

If the beam based random access preamble is detected from any beam (S804), the base station 100 recognizes that the terminal 210 belongs to the corresponding beam, and transmits the random access response to the terminal 210 using the beam from which the beam based random access preamble is detected (S806).

Meanwhile, if the cell based random access preamble is detected from a plurality of beams (S808), the base station 100 confirms a beam to which the terminal 210 transmitting the corresponding cell based random access preamble belongs (S810), and transmits the random access response to the terminal 210 using the beam to which the terminal 210 belongs (S812).

As a method for confirming whether or not the terminal 210 transmitting the cell based random access preamble belongs to any beam, various methods may be used. For example, the following two methods may be used. First, each beam detecting the cell based random access preamble measures reception quality of the corresponding cell based random access preamble, for example, signal-to-noise ratio (SNR), and transmits the measured SNR to a central processing unit (CPU) of the base station 100. The CPU of the base station 100 determines that a beam having the highest SNR belongs to the corresponding terminal 210, based on the SNR measured for each beam, and transmits the random access response through the corresponding beam. Second, if the terminal 210 determines one beam to be used for communication, the terminal 210 feedbacks beam information to the base station through a specific resource of a control channel, and the base station 210 may confirm a beam to which the terminal 210 belongs, using the control channel. The base station 100 transmits the random access response through the beam confirmed using the control channel.

Meanwhile, if the base station 100 fails the detection of the beam based random access preamble and the detection of the cell based random access preamble, the base station 100 determines a random access to be failed (S814).

Figure 9:
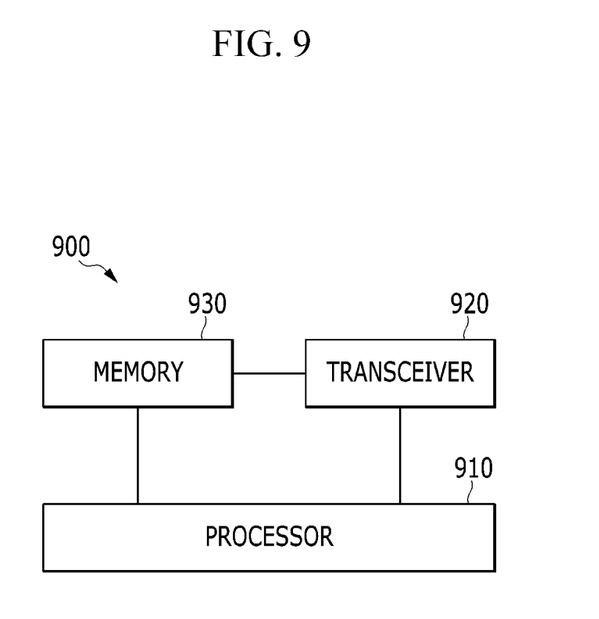
FIG. 9 is a drawing illustrating an apparatus for a random access of a terminal according to an exemplary embodiment of the present invention.

FIG. 9 is a drawing illustrating an apparatus for a random access of a terminal according to an exemplary embodiment of the present invention.

Referring to FIG. 9, an apparatus 900 for a random access of the terminals 210 and 220 includes a processor 910, a transceiver 920, and a memory 930.

The processor 910 performs procedures described with reference to FIGS. 5 to 7 to perform the random access procedure. In addition, the processor 910 measures signal quality of a downlink reference signal received from a plurality of beams, and determines a beam having the best signal quality as a beam to be used for communication based on the measurement result. The processor 910 may determine the beam based random access preamble from the beam based preamble groups BG0, BG1, and BG2, and may use the determined beam based random access preamble for the random access. If the random access response is not received from the base station 100 even if the beam based random access preamble is retransmitted as many as the set number of times, the processor 910 may determine the cell based random access preamble from the cell based preamble groups CG0 and CG1 and may use the determined cell based random access preamble for the random access. In addition, in the case of the set exception case, the processor 910 may determine the cell based random access preamble from the cell based preamble groups CG0, CG1, and CG2, and may use the determined cell based random access preamble for the random access. The above-mentioned processor 910 may be implemented by a central processing unit, other chipset, a microprocessor, or the like.

The transceiver 920 transmits the beam based random access preamble or the cell based random access preamble to the base station 100, and receives the random access response from the base station 100. In addition, the transceiver 920 may receive system information or the downlink reference signal required for the random access procedure from the base station 100.

The memory 930 stores instructions to be performed by the processor 910 or temporarily stores instructions by loading instructions from a storage device (not shown), and the processor 910 executes the instructions which are stored in the memory 930 or loaded.

The processor 910 and the memory 930 are connected to each other through a bus (not shown), and the bus may also be connected to an input/output (I/O) interface (not shown). Here, the I/O interface may be connected to the transceiver 920, and may be connected to peripheral devices such as an input device, a display, a speaker, a storage device, and the like.

Figure 10:
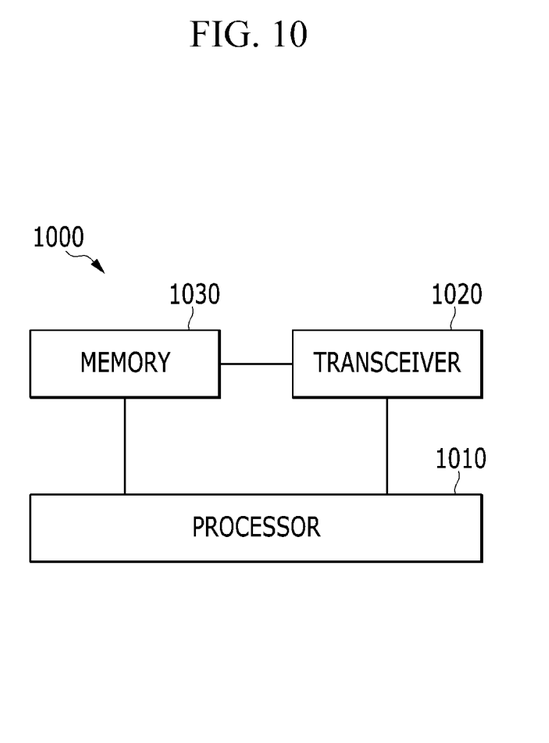
FIG. 10 is a drawing illustrating an apparatus for a random access of a base station according to an exemplary embodiment of the present invention.

FIG. 10 is a drawing illustrating an apparatus for a random access of a base station according to an exemplary embodiment of the present invention.

Referring to FIG. 10, an apparatus 1000 for a random access of the base station 100 includes a processor 1010, a transceiver 1020, and a memory 1030.

The processor 1010 performs procedures described with reference to FIG. 8 to process the random access of the terminals 210 and 220. The processor 1010 classifies a plurality of sequences used as the random access preamble into a contention based preamble collection and a non-contention based preamble collection, respectively, subdivides sequences in the contention based preamble collection into one or more cell based preamble groups CG0 and CG1, and one or more beam based preamble groups BG0 and BG1, and subdivides sequences in the non-contention based preamble collection into one or more cell based preamble group CG2 and one or more beam based preamble group BG2. In addition, the sequences in the beam based preamble groups BG0, BG1, and BG2 are classified into random access preambles usable for each beam, and random access preamble classification information as described above may be informed to the terminals 210 and 220 through system information. The processor 1010 performs a detection operation of the random access preamble transmitted from the terminals 210 and 220 in a resource allocated to the random access for each beam, and if the random access preamble is detected, the processor 1010 generates a random access response. If the processor 1010 detects the cell based random access preamble according to the detection operation of the random access preamble, the processor 1010 may perform a procedure of confirming beams to which the terminals 210 and 220 belong. The above-mentioned processor 1010 may be implemented by a central processing unit, other chipset, a microprocessor, or the like.

The transceiver 1020 transmits the system information, the downlink reference signal, and the random access response to the terminals 210 and 220, and receives the beam based random access preamble or the cell based random access preamble from the terminals 210 and 220.

The memory 1030 stores instructions to be performed by the processor 1010 or temporarily stores instructions by loading instructions from a storage device (not shown), and the processor 1010 executes the instructions which are stored in the memory 1030 or loaded.

The processor 1010 and the memory 1030 are connected to each other through a bus (not shown), and the bus may also be connected to an input/output interface (not shown). Here, the I/O interface may be connected to the transceiver 1020, and may be connected to peripheral devices such as an input device, a display, a speaker, a storage device, and the like.

According to an embodiment of the present invention, by reducing contention possibility in the random access procedure in the communications systems operating the multi-beam, latency may be decreased, and by reducing computation for the preamble detection, the preamble detection time may be reduced.

The exemplary embodiments of the present invention are not embodied only by an apparatus and/or method described above. Alternatively, the exemplary embodiments may be embodied by a program performing functions, which correspond to the configuration of the exemplary embodiments of the present invention, or a recording medium on which the program is recorded. These implementations can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a random access of a terminal in a communications system using at least one beam, the method comprising:
   determining a random access preamble from a beam based preamble group and a cell based preamble group, respectively;
   if a random access preamble from the beam based preamble group is determined to be used, transmitting the determined random access preamble through a beam among the at least one beam; and
   if a random access response for the random access preamble is not received from a base station for a set interval, transmitting the determined random access preamble from another group through the beam,
   wherein the cell based preamble group includes random access preambles allocated in each cell, and the beam based preamble group includes random access preambles allocated in each beam,
   wherein the determining of the random access preamble from one group includes:
   if it does not correspond to any of exception cases, preferentially selecting the random access preamble from the beam based preamble group; and
   if it corresponds to any of the exception cases, selecting the new random access preamble from the cell based preamble group, and
   wherein the exception cases include:
      exception case 1, if a value of path-loss estimated from a reference signal of the base station is greater than a set reference value,
      exception case 2, if interference between a beam determined by the terminal and a neighboring beam of the base station is greater than a set reference value, and
      exception case 3, in the case in which restriction on latency of the terminal is higher than a set reference.

2. The method of claim 1, wherein the set interval includes an interval retransmitting the beam based random access preamble as many as the set number of times.

3. The method of claim 1, wherein: a plurality of sequences usable for a random access are classified into the cell based preamble group and the beam based preamble group, and sequences in the beam based preamble group are allocated to the plurality of beams.

4. The method of claim 1, further comprising: if a random access response for the random access preamble is not received with from the base station within the set interval, increasing transmission power of the random access preamble as many as the set number of times to retransmit the random access preamble.

5. The method of claim 1, wherein the determining of the beam to be communicated with the terminal includes: measuring signal quality of each beam based on downlink reference signals each transmitted through the plurality of beams from the base station; and determining a beam having the best signal quality as a beam to be communicated with the terminal.

6. A method for a random access of a base station in a communications system using a plurality of beams, the method comprising:
   performing a detection operation of a random access preamble transmitted from a terminal using random access preambles allocated to a beam based preamble group and a cell based preamble group, respectively;

if a beam based random access preamble from the beam based preamble group is detected from any one of the plurality of beams, transmitting a random access response to the terminal using the beam from which the beam based random access preamble is detected; and if a cell based random access preamble from a cell based preamble group is detected from at least one of the plurality of beams, transmitting the random access response to the terminal using a beam to which the terminal belongs, wherein cell based preamble group includes random access preambles allocated in each cell, and the beam based preamble group includes random access preambles allocated in each beam, and wherein the cell based random access preamble is transmitted upon an assessment made by the terminal of each of the following exception cases:
  exception case 1, if a value of path-loss estimated from a reference signal of the base station is greater than a set reference value,
  exception case 2, if interference between a beam determined by the terminal and a neighboring beam of the base station is greater than a set reference value, and
  exception case 3, in the case in which restriction on latency of the terminal is higher than a set reference.

7. The method of claim 6, wherein the performing of the detection operation of the random access preamble includes: detecting the beam based random access preamble using random access preambles allocated to a corresponding beam for each beam; and detecting the cell based random access preamble using random access preambles in the cell based preamble group for each beam.

8. The method of claim 6, wherein: the transmitting of the beam based random access response or the cell based random access response to the terminal using the beam to which the terminal belongs includes confirming the beam to which the terminal belongs.

9. The method of claim 8, wherein: the confirming of the beam to which the terminal belongs includes: measuring reception quality of the cell based random access preamble from the at least one beam; and determining a beam having the highest reception quality of the cell based random access preamble as the beam to which the terminal belongs.

10. The method of claim 8, wherein the confirming of the beam to which the terminal belongs includes receiving information of the beam to which the terminal belongs, from the terminal.

11. An apparatus for a random access of a terminal in a communications system using at least one beam, the apparatus comprising:
  a processor determining a-random access preamble from a beam based preamble group and a cell based preamble group, respectively; and
  a transceiver, if a random access preamble from the beam based preamble group is determined to be used, transmitting the determined random access preamble through a beam among the plurality of beams, and if a random access response for the transmitted random access preamble is not received from a base station for a set interval, transmitting a random access preamble determined from the cell based preamble group, wherein the cell based preamble group include random access preambles allocated in each cell, and the beam based preamble group includes random access preambles allocated in each beam, and wherein the processor determines the random access preamble from the cell based preamble group when it corresponds to each of the following exception cases:
  exception case 1, if a value of path-loss estimated from a reference signal of the base station is greater than a set reference value,
  exception case 2, if interference between a beam determined by the terminal and a neighboring beam of the base station is greater than a set reference value, and
  exception case 3, in the case in which restriction on latency of the terminal is higher than a set reference.

12. An apparatus for a random access of a base station in a communications system using a plurality of beams, the apparatus comprising:
  a processor performing a detection operation of a beam based random access preamble using random access preambles of a beam based preamble group, and performing a detection operation of a cell based random access preamble using random access preambles of a cell based preamble group; and
  a transceiver, if the beam based random access preamble is detected from any one of the plurality of beams, transmitting the random access response to a terminal using the beam from which the beam based random access preamble is detected, and if a cell based random access preamble is detected from at least one of the plurality of beams, transmitting the random access response to the terminal using a beam to which the terminal belongs, wherein the cell based preamble group includes random access preambles allocated in each cell, and the beam based preamble group includes random access preambles allocated in each beam, and wherein the cell based random access preamble is transmitted upon an assessment made by the terminal of each of the following exception cases:
  exception case 1, if a value of path-loss estimated from a reference signal of the base station is greater than a set reference value,
  exception case 2, if interference between a beam determined by the terminal and a neighboring beam of the base station is greater than a set reference value, and
  exception case 3, in the case in which restriction on latency of the terminal is higher than a set reference.

* * * * *